(12) United States Patent
Ohashi

(10) Patent No.: US 8,156,329 B2
(45) Date of Patent: Apr. 10, 2012

(54) NETWORK DEVICE MANAGEMENT APPARATUS AND CONTROL METHOD THEREOF

(75) Inventor: Toshio Ohashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 12/479,859

(22) Filed: Jun. 8, 2009

(65) Prior Publication Data

US 2009/0307752 A1 Dec. 10, 2009

(30) Foreign Application Priority Data

Jun. 10, 2008 (JP) .................................. 2008-151820

(51) Int. Cl.
*H04L 29/06* (2006.01)
*H04L 9/32* (2006.01)
*G06F 7/04* (2006.01)
*G06F 9/00* (2006.01)

(52) U.S. Cl. ........ 713/166; 713/150; 713/151; 713/168; 726/2; 726/14; 726/15; 726/27

(58) Field of Classification Search .................. 726/3, 2, 726/14, 15, 27; 713/150, 151, 166, 168
See application file for complete search history.

(56) References Cited

U.S. PATENT DOCUMENTS

| | | | |
|---|---|---|---|
| 7,197,766 B1 * | 3/2007 | Ræstad et al. ................. | 726/14 |
| 7,603,697 B1 * | 10/2009 | Kupsh et al. ...................... | 726/2 |
| 2002/0129271 A1 * | 9/2002 | Stanaway et al. ............. | 713/201 |
| 2005/0066197 A1 | 3/2005 | Hirata | |
| 2005/0149736 A1 * | 7/2005 | Kim .............................. | 713/177 |
| 2006/0143705 A1 * | 6/2006 | Sentoff ........................... | 726/19 |
| 2009/0113522 A1 * | 4/2009 | Crassous et al. ................. | 726/4 |

FOREIGN PATENT DOCUMENTS

| | | |
|---|---|---|
| JP | 2004-236030 A | 8/2004 |
| JP | 2005-101741 A | 4/2005 |

* cited by examiner

*Primary Examiner* — Mohammad Reza
(74) *Attorney, Agent, or Firm* — Canon U.S.A., Inc., IP Division

(57) ABSTRACT

A network device management apparatus includes a search unit configured to search for a network device supporting a first communication protocol, an authentication information input unit configured to input authentication information used in communication with the network device using the first communication protocol, an authentication executing unit configured to execute authentication of the network device by using the authentication information, a first checking unit configured to, when the authentication by the authentication executing unit is successful, check whether a second communication protocol different from the first communication protocol is enabled in the network device, and a setting changing unit configured to change a setting of the second communication protocol depending on a result of the checking performed by the first checking unit.

19 Claims, 10 Drawing Sheets

NETWORK DEVICE MANAGEMENT APPARATUS AND CONTROL METHOD THEREOF

BACKGROUND OF THE INVENTION

1. Field of the Invention

The present invention relates to a network device management apparatus and system configured to securely manage a network device using a network device management protocol, and a network device management method.

2. Description of the Related Art

In recent years, there has been increasing interest in security in network environments. This is also true for network device management environments associated with printers, multifunction devices, or other devices on a network. In network device management, SNMP (Simple Network Management Protocol) is widely used. As a new version of SNMP, version 3 has appeared which provides an enhanced security function. Note that version 1 and version 2 of SNMP, which are lower versions of SNMP version 3, are still used. In many cases, it is becoming increasingly common to use a secure protocol such as IPSec in communication between a management apparatus and a network device. In such a technological situation, there has appeared a technique of managing network devices in accordance with an optimum policy by using the security function described above.

Note that IPSec refers to a communication protocol having the capability of preventing data from being tampered with and the capability of concealing data by using an encryption technique, for each IP packet.

Conventionally, as a method of securely managing network devices using a network device management protocol, it is common to monitor a network environment and dynamically apply an optimum security policy depending on an operating condition (see Japanese Patent Laid-Open No. 2004-236030). This method has an advantage that it is possible to apply the security policy to all network devices that satisfy a particular criterion, and thus it is possible to efficiently perform secure network device management.

Japanese Patent Laid-Open No. 2005-101741 discloses a technique to achieve device management with proper security by applying different security policies for two phases, i.e., a phase in which searching for network devices is performed, and a phase in which the network devices are controlled.

In the conventional technique described above, the secure network device management is achieved by properly changing, with a management apparatus, the security policy depending on the network status or the monitor phase.

However, in the conventional technique, a user has to manually change the setting depending on a security level required in the network device management performed by the management apparatus.

SUMMARY OF THE INVENTION

According to a first aspect of the present invention, there is provided a network device management apparatus that includes a search unit configured to search for a network device supporting a first communication protocol, an authentication information input unit configured to input authentication information used in communication with the network device using the first communication protocol, an authentication executing unit configured to execute authentication of the network device by using the authentication information, a first checking unit configured to, when the authentication by the authentication executing unit is successful, check whether a second communication protocol different from the first communication protocol is enabled in the network device, and a setting changing unit configured to change a setting of the second communication protocol depending on a result of the checking performed by the first checking unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Exemplary embodiments of the present invention will now be described in detail in accordance with the accompanying drawings.

In a situation in which a management apparatus is managing a network device via security-protected communication, if the network device is set such that remote management using an unsecure protocol is enabled, the network device can be managed by another management apparatus using the unsecure protocol. For example, let us consider below a case in which a network device is set such that both versions SNMPv1 and SNMPv3 are enabled. In this case, even if the management apparatus manages the network device using SNMPv3 that is a secure protocol supporting authentication/encryption, another management apparatus can manage, in an unauthorized manner, the network device by using SNMPv1 having no security capability. In such a situation, use of SNMPv3 by the management apparatus does not mean that management is performed in a secure manner. Therefore, when the management apparatus manages network devices using a secure protocol, it may be desirable that the network devices are set such that unsecure protocols are disabled.

In some cases, when network devices are shipped, an initial account for SNMPv3 is set by vendors. This initial account is for use in an initial installation operation or the like performed by a service person. Generally, the initial account is to be deleted by an administrator after a user has produced a new SNMPv3 account and started an operation. Thus, in a state in which the operation is being performed with the management apparatus using the initial account, it can be difficult to achieve complete security.

Figure 1:
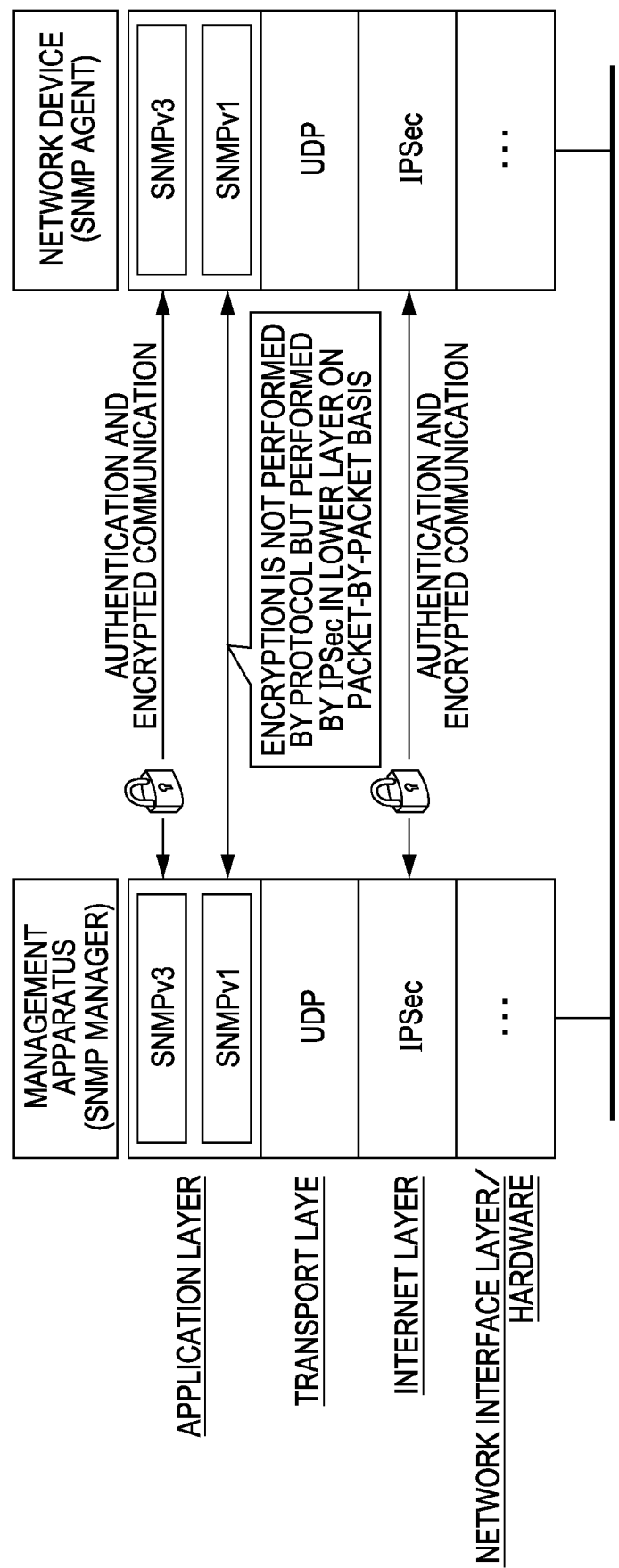
FIG. 1 is a diagram illustrating a relationship between IPSec and SNMP according to an embodiment of the present invention.

There may be cases in which a management apparatus manages network devices using SNMP while IPSec is used in an Internet layer that is a protocol layer lower than SNMP. FIG. 1 illustrates a relationship between IPSec and SNMP on an OSI reference model. IPSec supports authentication and encryption functions.

The OSI reference model is a model established by the International Organization for Standardization (ISO). In this model, communication functions of a computer are defined in hierarchically divided layers.

As described above, to securely manage network devices, it may be necessary to individually change the setting of the network devices depending on the security environment in which the respective network devices are managed by the management apparatus. In the conventional technique described above, a user determines the setting and manually changes the setting depending on the security level in which the network devices are managed by the management apparatus.

Aspects of the present invention provide a technique to dynamically change the security policy for each network device to a proper state depending on the security level in which the network device is managed by the management apparatus.

Next, exemplary embodiments of the present invention are described below with reference to the accompanying drawings.

System Configuration

Figure 2:
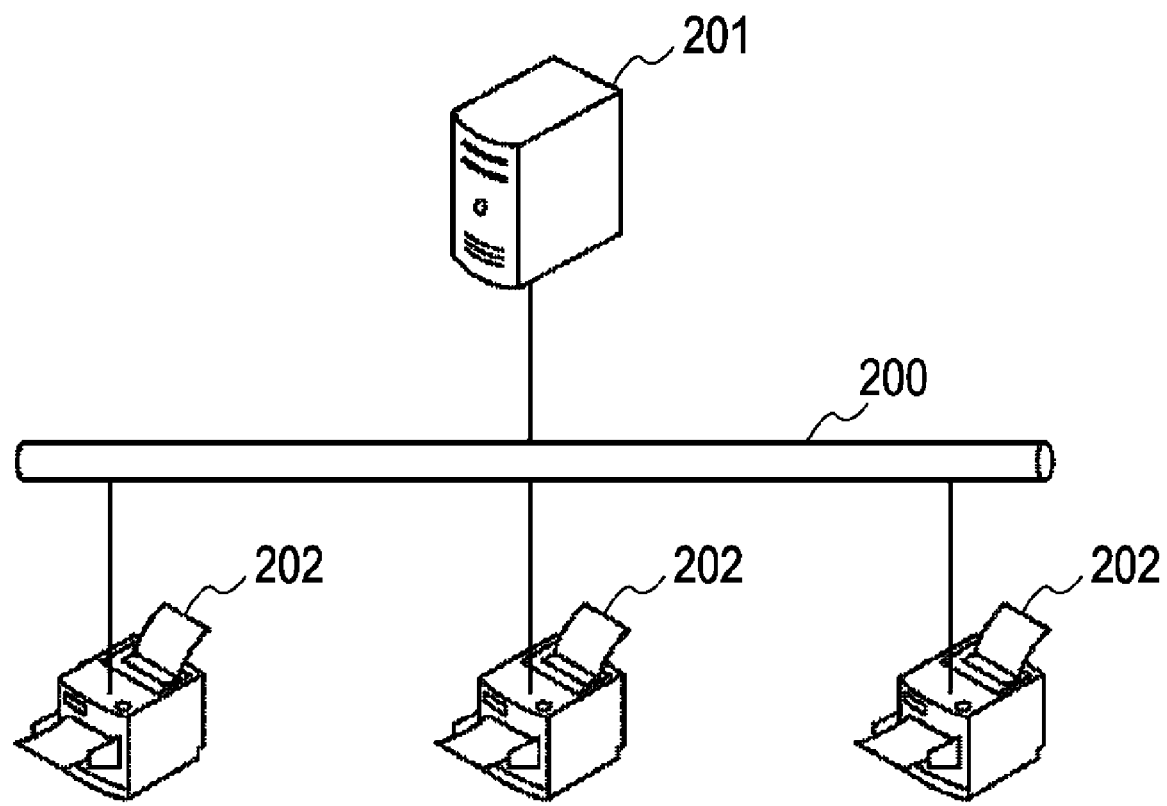
FIG. 2 is a diagram illustrating a total system according to an embodiment of the present invention.

FIG. 2 is a diagram illustrating an overall configuration of a network management system according to a first exemplary embodiment of the present invention. In FIG. 2, the network management system includes a network device management apparatus 201 and network devices 202 (managed devices) that are connected to each other via a network 200.

As for the network 200, any network may be employed, for example as long as it can be configured in the form of a TCP/IP network, and the SNMP protocol (version 1 and version 3) can be used to monitor and control communication devices via the network. For example, LAN may be used as this network. Note that SNMP is an abbreviation for Simple Network Management Protocol.

SNMP is a communication protocol used on the TCP/IP network to manage communication devices such as a router, a computer, a terminal, etc., connected to the TCP/IP network by monitoring and controlling them via the network. Each device subjected to control using SNMP has a manage information database called MIB, and a device that performs management makes settings properly based on the MIB associated with the device to be managed.

The network device management apparatus 201 and the network device 202 are described below in terms of their hardware configuration and software configuration.

Hardware Configuration of Network Device Management Apparatus

Figure 3:
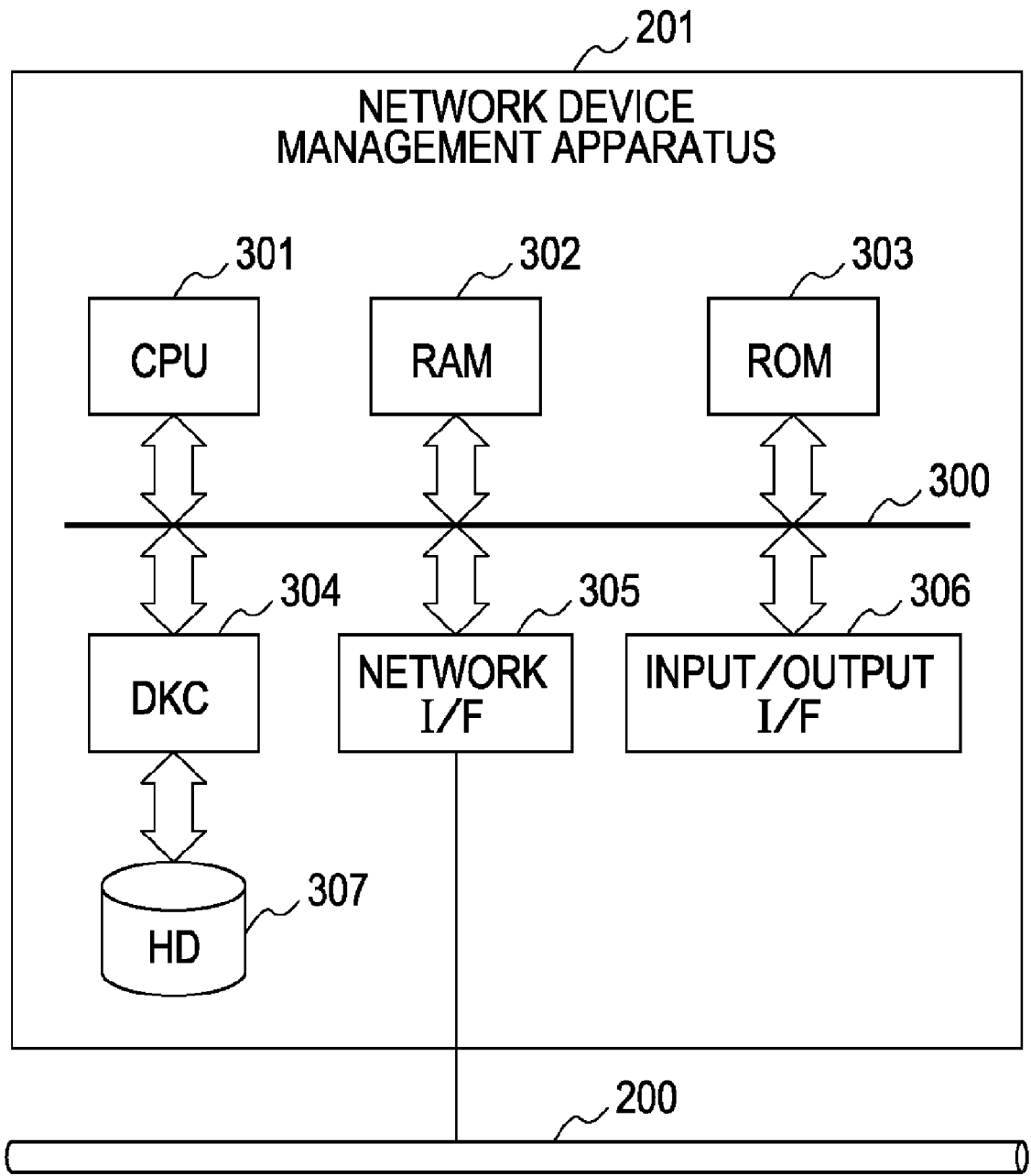
FIG. 3 is a diagram illustrating a hardware configuration of a network device management apparatus according to an embodiment of the present invention.

FIG. 3 illustrates an embodiment of the hardware configuration of the network device management apparatus.

According to the embodiment as shown, a network device management apparatus 101 is configured on a general-purpose computer. A system bus 300 serves to connect elements in the computers to each other. A CPU (Central Processing Unit) 301 is responsible for control over the whole computer, and is capable of performing a calculation operation and the like. A RAM (Random Access Memory) 302 is a storage area in which various programs and data are loaded and executed for each process. A ROM (Read Only Memory) 303 is a storage area in which a system boot program or the like is stored. A DKC (external storage controller) 304 controls an external storage device such as a hard disk (HD) 307. In the HD 307, programs and data are stored so that they can be referred to or loaded into the RAM as required.

The network device management apparatus can operate in a state in which the CPU is executing a basic I/O program and an OS. The basic I/O program can be stored in the ROM, and the OS can be stored in the HD. If the power of the computer is turned on, the OS is loaded into the RAM from the HD by an initial program load function in the basic I/O program, and the OS starts its operation. A network interface 305 makes a connection to the network and performs network communication. An input/output interface 306 can be connected to a keyboard or a display for inputting/outputting data.

Software Configuration of Network Device Management Apparatus

Figure 4:
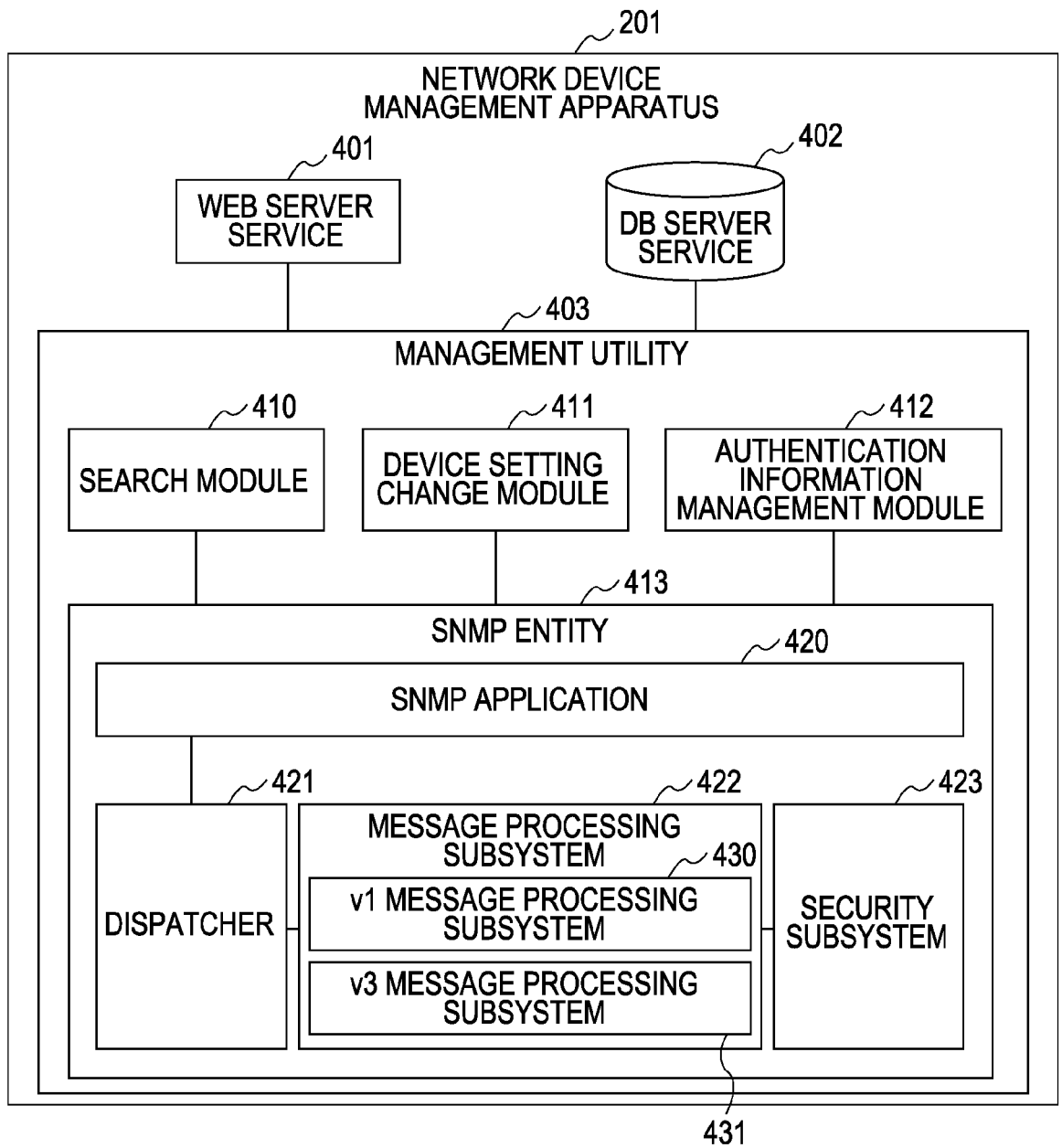
FIG. 4 is a diagram illustrating a software configuration of a network device management apparatus according to an embodiment of the present invention.

Next, the software configuration of the embodiment of the network device management apparatus is described with reference to FIG. 4. The network device management apparatus includes a Web server service, a DB server service, and a management utility, which can be enabled when the basic I/O program and the OS are running. These pieces of software are stored as programs in the HD, and they are loaded into the RAM and executed on the OS.

If the Web server service 401 receives a GET request from a Web browser of a client PC via HTTP, the Web server service 401 provides a service of returning Web page data stored in the HD. The Web server service makes it possible to make a connection from the outside to the network device management apparatus via the network. In a case where it is not necessary to connect the management utility of the network device management apparatus from the outside, the Web server service may not be necessary.

The DB server service 402 stores data used by the management utility and provides acquisition service in terms of the stored data. The DB server service may be implemented not in the network device management apparatus but on another computer connected to the network device management apparatus via the network. In a case where storage/acquisition of data is performed within the management utility, the DB server service may not be necessary.

A management utility 403 is software that communicates with the network devices to change the settings of the network devices and periodically monitor the status of the network devices. The management utility includes function modules such as a search module, a device setting change module, and an authentication information management module, and also includes an SNMP entity. The management utility may further include other function modules.

The search module 410 has a function of searching for network devices.

The device setting change module 411 has a function of changing, via the network, the setting information associated with the network devices detected in the search. The changeable setting information associated with the network devices includes setting information in terms of enabling/disabling of SNMPv1/v3 and in terms of read/write access.

The authentication information management module 412 has a function of storing SNMPv3 passwords input by a user for the network devices detected in the search.

The SNMP entity 413 realizes a management function in the SNMP protocol. The SNMP entity 413 includes an SNMP application, a dispatcher, a message processing subsystem, and a security subsystem. Furthermore, in the message processing subsystem 422, a v1 message processing model 430 and a v3 message processing model 431 are implemented for respective SNMP versions. The SNMP application 420 is an application to acquire and set management information and receive a notification such as TRAP using an interface of the dispatcher. The dispatcher 421 performs a process such as transmitting/receiving of SNMP messages and transferring of messages to the message processing subsystem 422 depending on the version. In the message processing subsystem 422, v1 messages are processed by the v1 message processing model 430, while v3 messages are processed by the v3 message processing model 431. When communication is performed using SNMPv3, authentication and encryption of messages are performed in the security subsystem 423. In this process, SNMPv3 passwords stored in the authentication information management module 412 may be used.

Hardware Configuration of Network Device

Figure 5:
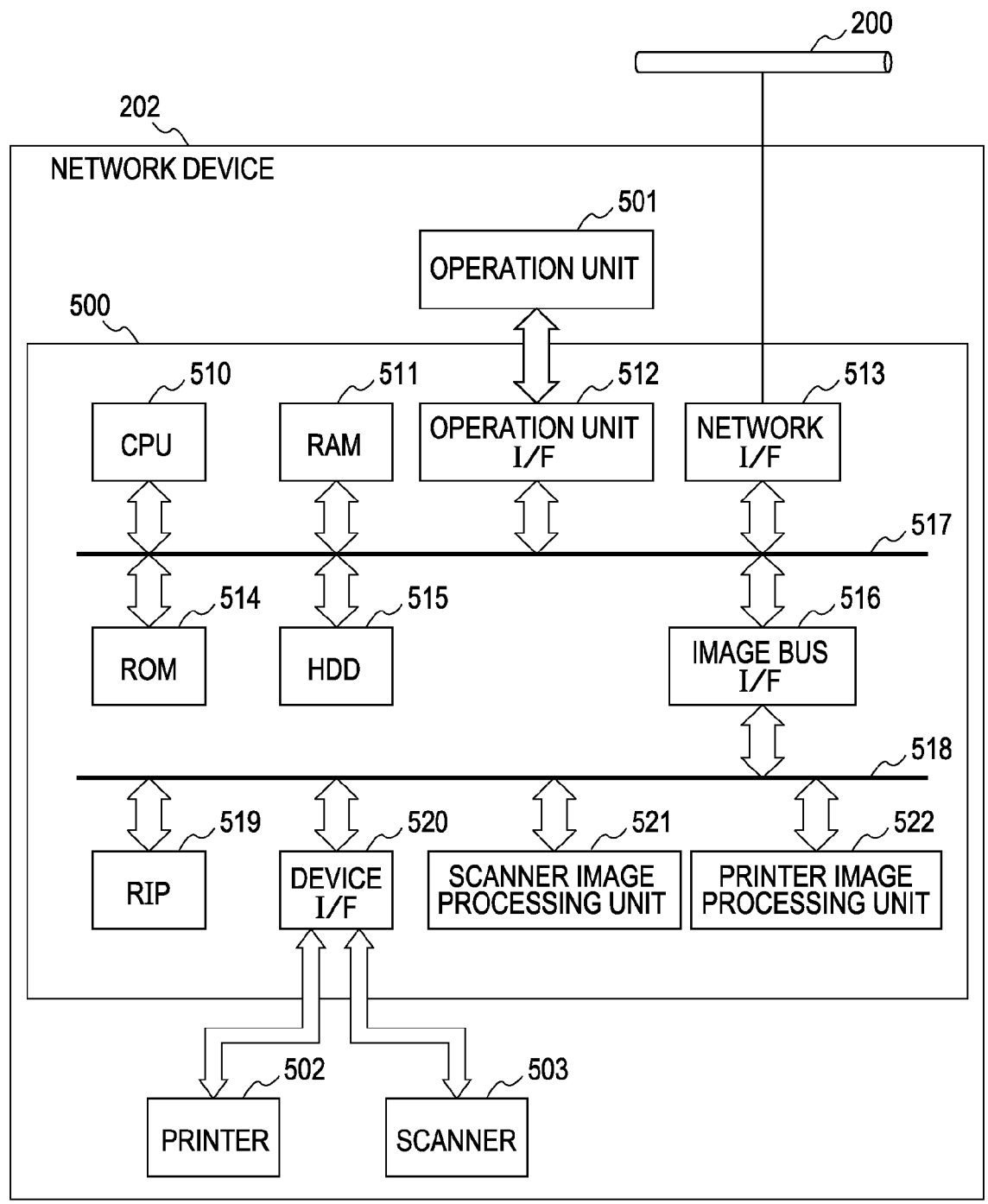
FIG. 5 is a diagram illustrating a hardware configuration of a network device according to an embodiment of the present invention.

As an example of a network device, an embodiment of a hardware configuration of an MFP (Multifunction Printer) is illustrated in FIG. 5. Note that the network device is not limited to an MFP, but the network device may also be of other types such as a printer, facsimile machine, etc.

The network device 102 according to this embodiment includes an operation unit, a printer, a scanner, and a controller unit. The controller unit 500 is connected to the network and communicates with the management apparatus 101. The operation unit 501, the printer 502, and the scanner 503 are connected to the controller unit and controlled thereby. Note that the network device also may not include the scanner.

The controller unit according to this embodiment includes a CPU, a RAM, an operation unit interface, a network interface, a ROM, an HDD, an image bus interface, a system bus, an image bus, a raster image processor, a device interface, a scanner image processing unit, and a printer image processing unit. In the configuration described above, the scanner and the scanner image processing unit may not necessarily be needed. The CPU 510 is a controller that controls the whole controller unit. The RAM 511 is a system work memory used by the CPU 510 in operation. The RAM is also used as an image memory for temporarily storing image data. The operation unit interface 512 serves as an interface with the operation unit and outputs image data to be displayed on the operation unit to the operation unit. The operation unit interface 512 also serves to transmit information input by a user via the operation unit to the CPU. The network interface 513 serves to make a connection to the network and input and output information from or to the network. The ROM 514 is a boot ROM in which a system boot program is stored. The HDD 515 is a hard disk drive for storing system software and image data. The image bus interface 516 is a bus bridge adapted to connect the system bus 517 to the image bus 518 adapted to transfer image data at a high speed, and the image bus interface 516 provides data structure conversion. The image bus 518 may be implemented by a PCI bus or an IEEE1394 bus. The raster image processor (RIP) 519 converts a PDL command received from the network into a bitmap image. The device interface 520 connects an input/output device such as the printer 502 or the scanner 503 to the controller unit, and performs synchronous/asynchronous conversion of image data. The scanner image processing unit 521 performs correcting, processing, and editing of input image data. The printer image processing unit 522 performs processing such as correction, resolution conversion, etc., on print output image data depending on the performance of the printer.

Software Configuration of Network Device

Figure 6:
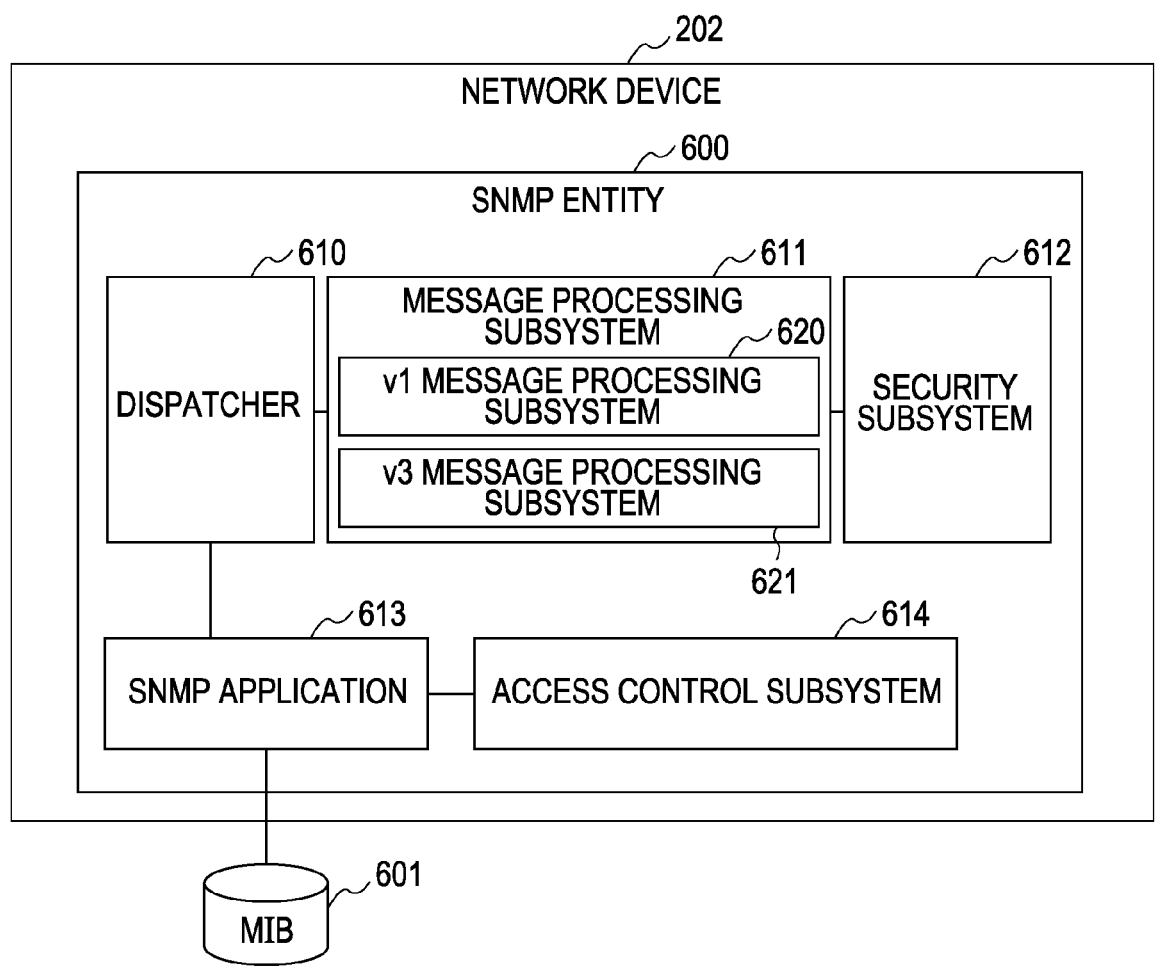
FIG. 6 is a diagram illustrating a software configuration of a network device according to an embodiment of the present invention.

Next, the software configuration of an embodiment of the network device is described with reference to FIG. 6.

The network device includes an NMP entity and an MIB. These pieces of software may be stored as programs in the HD, and they can be loaded into the RAM and executed.

The SNMP entity 600 according to this embodiment is configured using a dispatcher 610, a message processing subsystem 611, and a security subsystem 612, so that a management function can be realized using the SNMP protocol. The dispatcher 610 performs a process such as transmission/reception of SNMP messages and transferring of messages to the message processing subsystem 611. In the message processing subsystem 612, v1 messages are processed by the v1 message processing model 620, while v3 messages are processed by the v3 message processing model 621. When communication is performed using SNMPv3, authentication and encryption of messages are performed in the security subsystem 622. The SNMP application 613 is called from the dispatcher to access an MIB object for a response to management information or for a TRAP notification. In this process, an access control subsystem 614 controls the access to the MIB object.

An MIB object 601 is an object that defines management information associated with a network device in a management information structure (SMI) or the like.

The MIB refers to information that is provided by a network device managed using the SNMP to notify an external device of the status of the network device. The TRAP notification is one of SNMP messages to automatically provide a notification of the status (change in status). The SMI refers to a management information structure that defines a data structure, a data format, and a rule of naming management information for use in defining SNMP or MIB.

Operation of Network Device Management Apparatus

Figure 7:
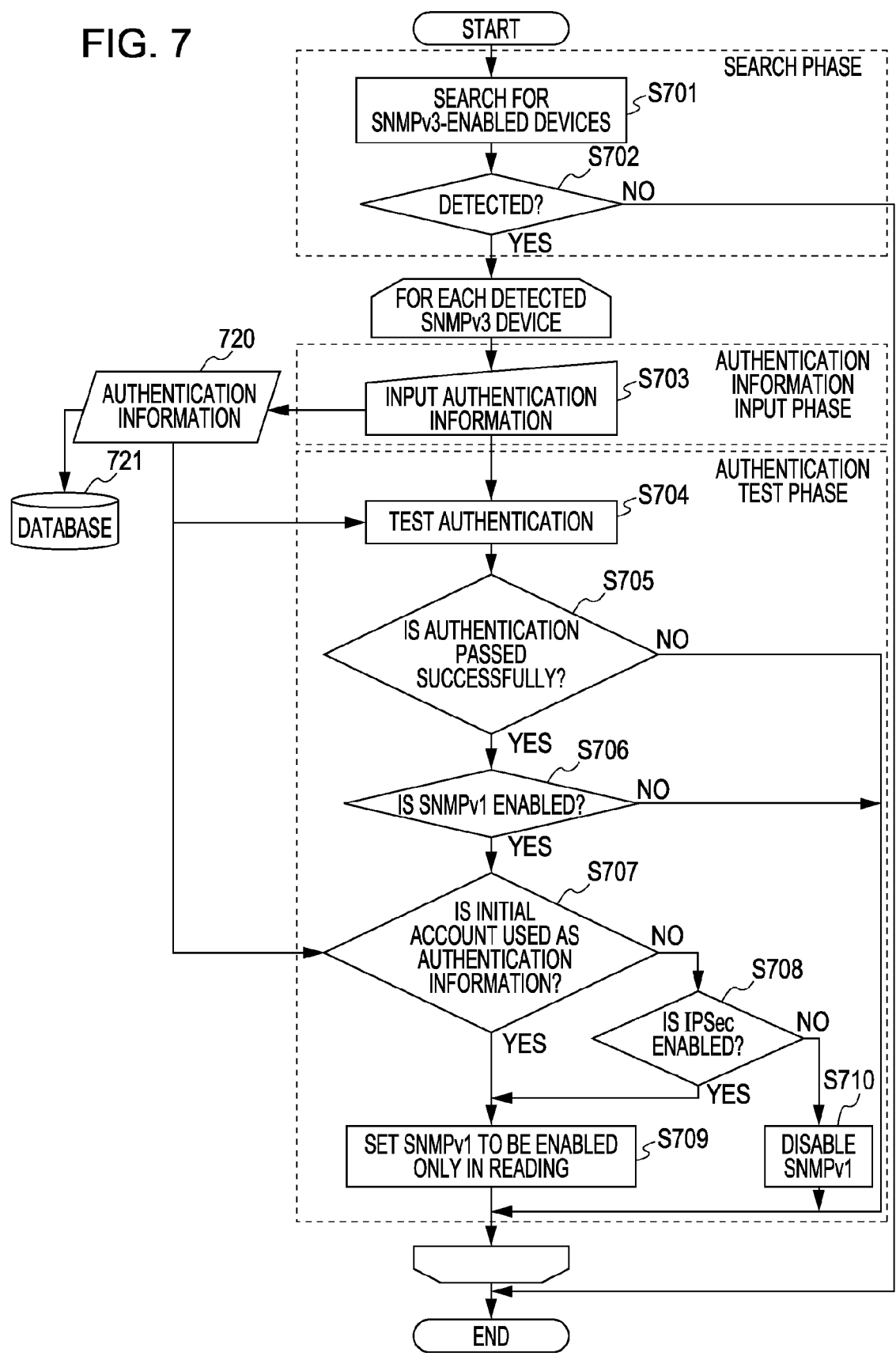
FIG. 7 is a flow chart illustrating an operation flow of a network device management apparatus according to an embodiment of the present invention.

Next, an example of the operation of the network device management apparatus is described below with reference to FIG. 7. The operation of the network device management apparatus can be roughly divided into three operations, i.e., an operation in the searching for network devices, an operation in storing authentication information, and an operation in executing an authentication test. These three operations are respectively described below.

Operation in Searching For Network Devices

Figure 8:
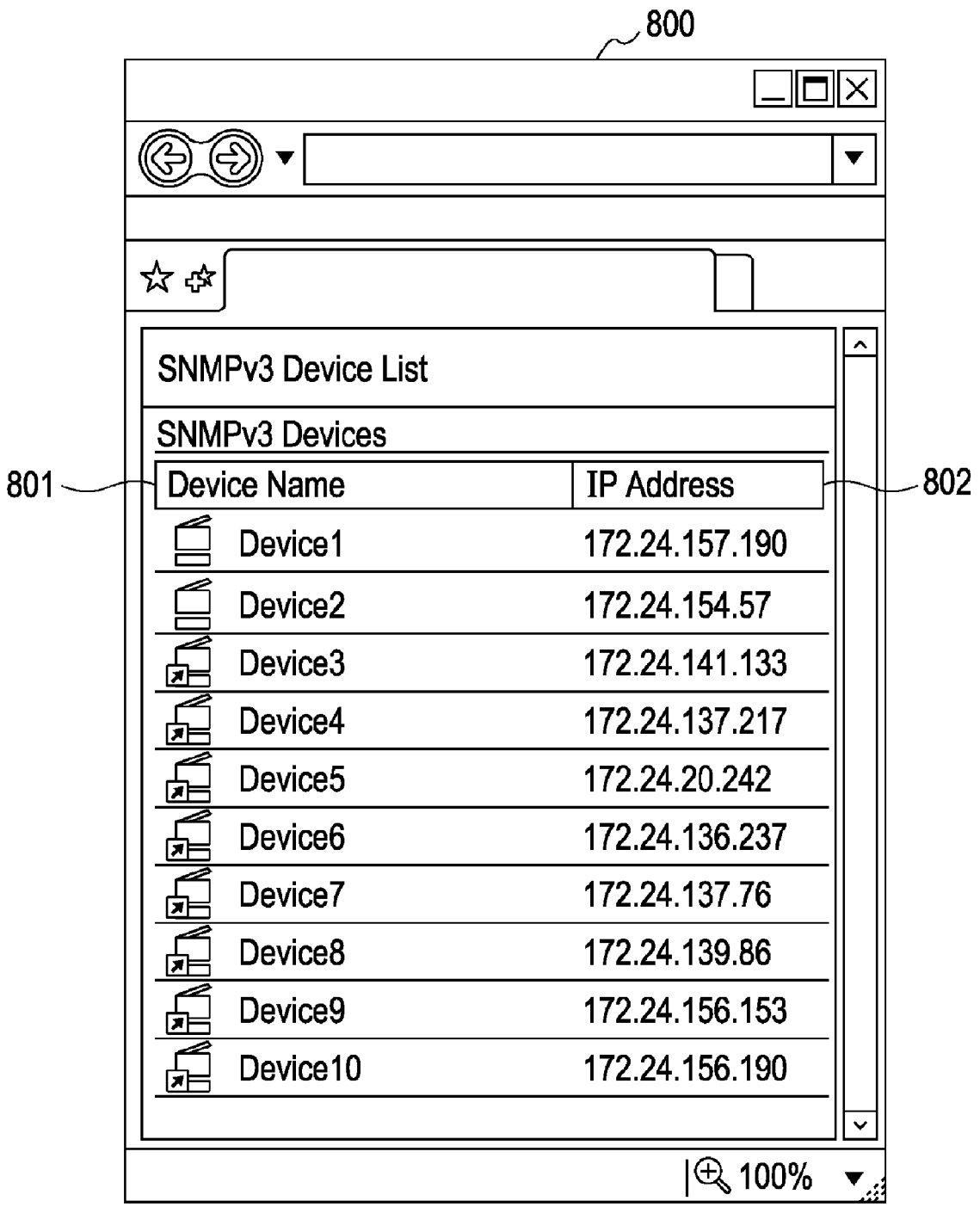
FIG. 8 is a diagram illustrating an example of a screen on which network devices detected in a search process are displayed according to an embodiment of the present invention.

First, in step S701, searching for SNMPv3-enabled network devices located on the network is performed. The searching for SNMPv3-enabled devices may be performed using an SNMP message or using a communication protocol other than SNMP. For example, in the case where the searching is performed using an SNMP message, a SNMP request message having no security function (i.e., having no authentication/encryption capability) is transmitted to devices. If a response message is returned from a device, it can be determined that it is possible to communicate with that device. Network devices detected in the search are listed on a detected network device display screen, for example, as shown in FIG. 8. In the example shown in FIG. 8, the management apparatus is accessed via a Web browser 800 and device names 801 and IP addresses 802 of detected network devices are displayed in the form of a list on the screen of the Web browser 800. Other items may also be displayed depending on the searching method.

Operation in Storing Authentication Information

Figure 9:
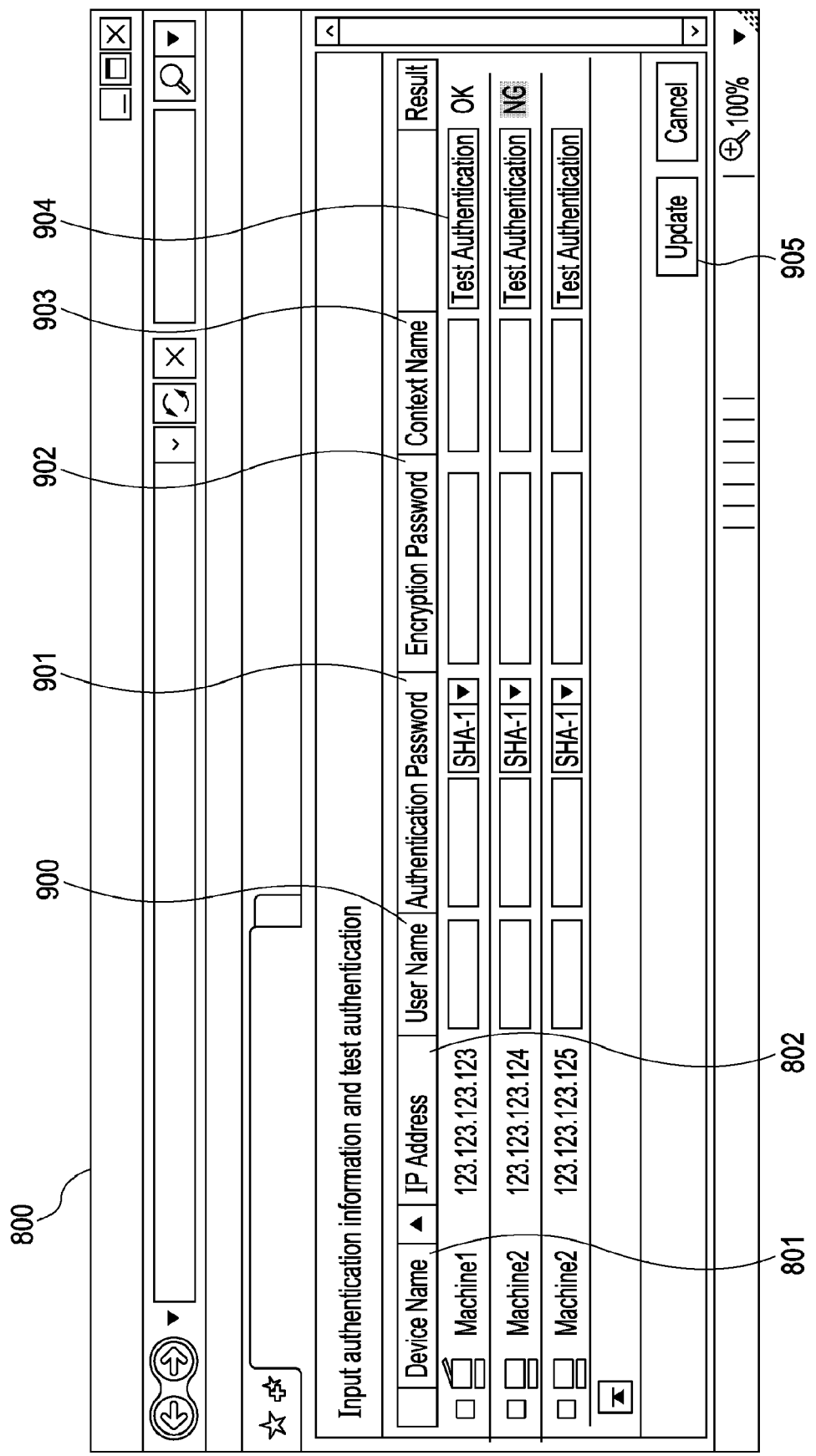
FIG. 9 is a diagram illustrating a screen for inputting authentication information according to an embodiment of the present invention.

After the searching process, if it is determined in step S702 that a SNMPv3 device is detected (YES in step S702), then the process proceeds to step S703 in which authentication information is input. If no SNMPv3 device is detected (NO in step S702), then processing is ended. The inputting of the authentication information is performed, because authentication information such as an authentication password or an encryption password is necessary to communicate with the network device detected by the management apparatus. Thus, an authentication information input screen is displayed to prompt a user to input authentication information for each network device. FIG. 9 illustrates an example of an authentication information input screen. In the example shown in FIG. 9, device names 801 and IP addresses 802 of network devices are displayed, and the user inputs a user name 900, an authentication password 901, an encryption password 902, and a context name 903. If a test authentication button 904 is pressed, testing is performed to determine whether SNMPv3 communication with the network devices is possible using the authentication information input at this time, and a result is displayed. The operation of the management apparatus in the authentication test will be described later. If an update button 905 is pressed, the authentication information 720 input at this time is stored in the database 721.

In general, after the user inputs the authentication information, if the authentication test shows that the authentication information is valid, then the user presses the update button to store the authentication information. Instead of providing the test authentication button on the authentication information input screen, another screen for the authentication test may be displayed after the authentication information is stored by the user. In the following SNMPv3 communication with network devices, the management apparatus uses the authentication information 720 stored in the database 721.

Operation in Authentication Test

After the authentication information is input in step S703 by the user via the authentication information input screen, if the test authentication button 806 is pressed, the management apparatus operates as follows.

In step S704, SNMPv3 communication with a network device is performed using the authentication information 720 input by the user. In the communication in the authentication test, in the present embodiment, arbitrary MIB data is acquired from the network device. Note that other types of data may be acquired in the communication as long as it is possible to determine whether SNMPv3 communication with the network device using the authentication information 720 is allowed.

In step S705, it is determined whether the authentication test is successful. In the present embodiment, as described above, the determination as to whether the authentication test is successful is performed by determining whether arbitrary MIB data has been acquired. Note that the determination as to whether the test authentication test is successful may be performed differently depending on data acquired in authentication test communication in step S704. In a case where the authentication test is unsuccessful (NO in step S705), it is determined that the input authentication information does not allow communication with the network device, and thus the process is ended. On the other hand, in the case where the authentication test is successful (YES in step S705), it is determined that it has become possible for the management apparatus to manage the network device using SNMPv3, and the process proceeds to step S706 to determine whether to change the setting of the network device into a state in which SNMPv1 is disabled or enabled in a read-only mode. Note that in the following explanation of the present embodiment, it is assumed that it is already known that SNMPv3 is a protocol with higher security than SNMPv1. Note that security level information associated with each protocol may be stored in a database in advance, and a determination may be performed as to whether which protocol is higher in security.

In step S706, it is determined whether the network device is currently set such that SNMPv1 is enabled. This may be performed based on whether any MIB information can be acquired via the communication with the network device using SNMPv1. In a case where information indicating whether SNMPv1 is enabled can be acquired using other protocols, the determination may be performed based on this information. If the SNMPv1 protocol is already disabled (NO in step S706), the process is ended. In a case where the SNMPv1 protocol is enabled (YES in step S706), the process proceeds to step S707 to check an account to determine whether an initial account is used as authentication information. Note that the determination in step S706 as to whether SNMPv1 is set to be enabled is an example of a process performed by the first checking unit.

In step S707, a determination is made as to whether authentication information 720 input by a user is the initial account. The initial account refers to a SNMPv3 account initially set by a vendor when the network device is shipped. This account is intended to be used by a service person in an initial setup operation or the like. In general, after a user has produced a new SNMPv3 account and has started an operation using SNMPv3, the initial account is deleted for the purpose of security. That is, when SNMPv3 communication is performed using the initial account, the operation is not in a state in which management is performed in a secure manner using SNMPv3. In such a transitional state, SNMPv1 setting should not be immediately disabled. In view of the above, if it is determined in S707 that SNMPv3 communication is being performed using the initial account (YES in step S707), then processing proceeds to step S709, where the setting of the network device is changed into a state in which SNMPv1 is allowed only in reading. As described above, in the case where management is not in a perfect state (as in the case where the initial account is used) although a secure protocol (SNMPv3) is used, it may be better to maintain an unsecure protocol for use only in reading without immediately disabling the unsecure protocol.

On the other hand, in a case where the authentication information is not the initial account (NO in step S707), it is determined that the network device management is being performed in a secure manner using SNMPv3, and thus the process proceeds to step S708 to perform an IPSec determination.

In step S708, a communication judgment is performed to determine whether the management apparatus uses IPSec in the communication with the network device. As shown in FIG. 1 and as described above, IPSec is a protocol used in a lower layer than the layer in which SNMP is used, and IPSec has a capability of authentication and encryption. Therefore, when communication is performed using IPSec (YES in step S708), SNMP messages are security-protected even if SNMPv1 having no capability of authentication and encryption is used. Therefore, in step S709, SNMPv1 is set to be usable only in reading without disabling it. On the other hand, in a case where IPSec is not used (NO in step S708), it is dangerous in terms of security to use SNMPv1 because neither authentication nor encryption is performed. Therefore, in S710, SNMPv1 is disabled, and processing is then ended. Note that the determination in terms of IPSec in S708 is an example of a process performed by the second checking unit.

As described above, when SNMPv1 is used in communication (without authentication or encryption), if SNMP messages are security-protected in the lower IPSec layer, the security risk is low. In such a situation, it is allowed to keep SNMPv1 usable only in reading without immediately disabling it.

In the present embodiment, SNMPv1 is used as a lower-order version of SNMPv3. Alternatively, SNMPv2 may be used instead of SNMPv1. SNMPv3 is an example of the first communication protocol, and SNMPv1 or SNMPv2 is an example of the second communication protocol.

IPSec is an example of the third communication protocol. IPSec is an abbreviation for security architecture for Internet protocol. IPSec is a communication protocol that provides the function of preventing data from being tamped with and a function of concealment in units of IP packets using an encryption technique. In communications using IPSec, because IP packets are transmitted and received in an encrypted form, it is not necessary for SNMP or application software using a high-order protocol such as TCP or UDP to be aware that encryption is performed by IPSec.

In the process described above, it is possible to dynamically change the security setting associated with the network device depending on the situation in terms of the management of the network device by the management apparatus. Thus, aspects of the present invention provide a technique to dynamically change a security policy for each network device into a proper state depending on a security level in managing the network device by a management apparatus.

In the first embodiment, an example has been shown in which when an authentication test has been performed for authentication information input by a user, setting of each network device is changed based on the situation in which the network device is managed by the management apparatus. In a second embodiment described below, in contrast, in a situation in which a management apparatus has a capability of communicating with a network device at a time specified by a user and executing a management task, the setting of the network device is changed based on a result of the execution of the management task.

The system configuration is the same as in the first embodiment described above, and thus a duplicate explanation thereof is omitted.

Operation of Network Device Management Apparatus

Figure 10:
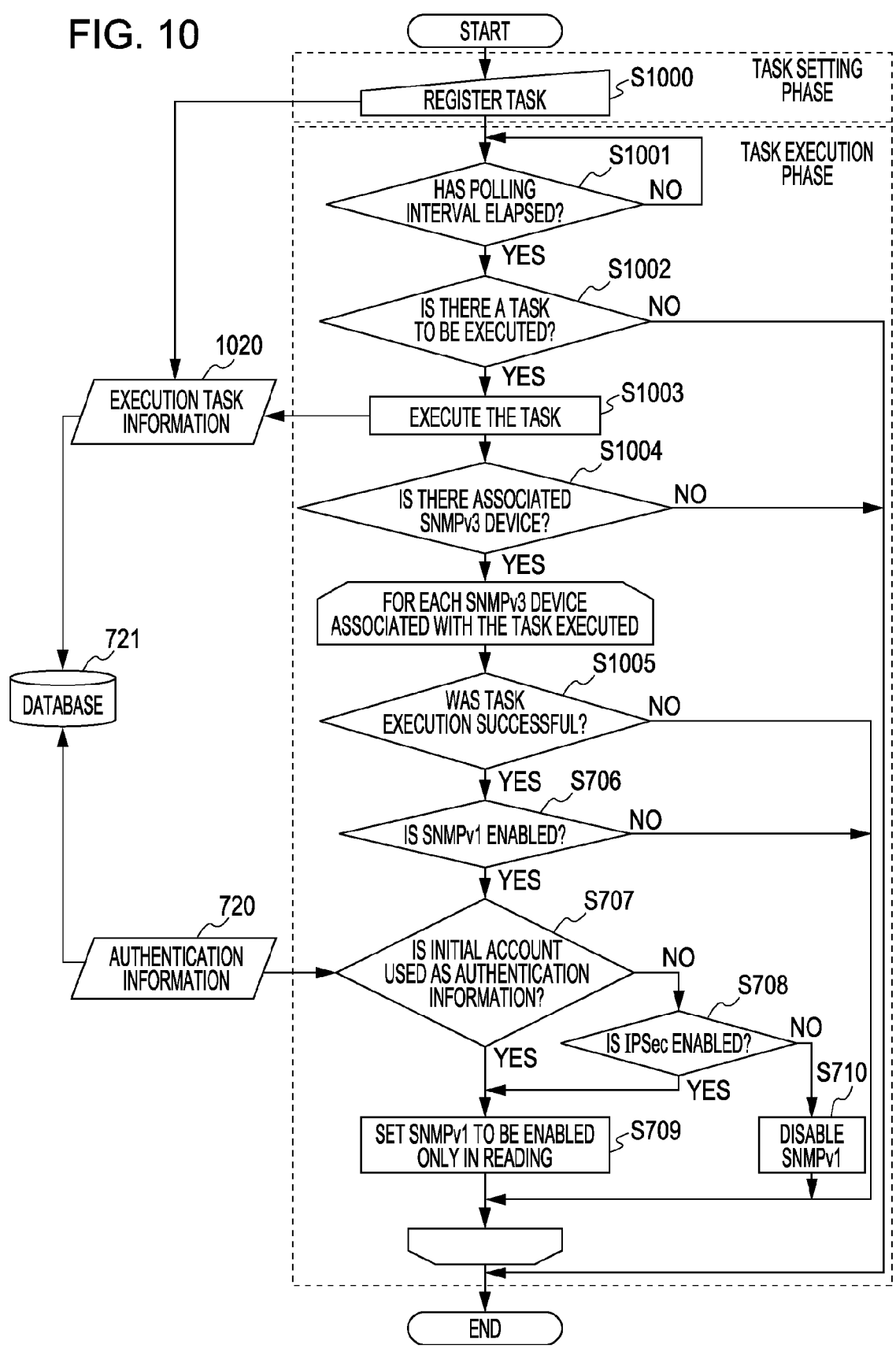
FIG. 10 is a flow chart illustrating an operation flow of a network device management apparatus according to an embodiment of the present invention.

The operation of the network device management apparatus according to the present embodiment is described below with reference to FIG. 10. Herein it is assumed that searching for network devices and inputting of authentication information have already been performed in a similar manner as in the first embodiment described above. The operation of the network device management apparatus can be roughly divided into two operations, i.e., an operation in registering a task and an operation in executing the task. These two operations are respectively described below.

Operation in Task Registration

In the present embodiment, the management apparatus performs communication to a specified network device at a time arbitrarily specified by a user, and performs a management operation such as an operation to change the setting of the network device. Such a management operation is referred to as a task or a management task. Although it is assumed in the present example that the setting is changed in the management operation performed on the network device, other operations such as acquisition of setting information or transmission of a file may be performed via communication with the network device.

The operation of the management apparatus in the task registration is described below.

In step S1000, a user registers a task to be executed at a specified time for a specified network device. As a result, target device information and execution time information are stored as execution task information 1020 in the database 721.

Operation in Execution of Task

A description is provided below as to the operation performed in the execution of the task in the state in which the task has been registered in the above-described manner.

In step S1001, a determination is performed as to whether a polling period has elapsed. The management apparatus is in a waiting state until the polling period has elapsed. If the polling period has elapsed (YES in step S1001), then in step S1002, the database is accessed to check the execution task information to determine whether there is a task to be executed at this time. If the polling period has not elapsed (NO in step S1001), then step S1001 is repeated.

If there is no task to be executed (NO in step S1002), the process is ended. If there is a task to be executed (YES in step S1002), the task is executed in step S1003, and an execution result is added to the execution task information 1020 and stored in the database.

In step S1004, based on the execution task information stored in the database, a determination is performed as to whether there is a network device to which communication was performed using SNMPv3 in an executed task. If the determination indicates that there is no network device to which communication was performed using SNMPv3 (NO in step S1004), the process is ended. If the determination indicates that there is a network device to which communication was performed using SNMPv3 (YES in step S1004), then in step S1005, a further determination is performed based on the execution task information stored in the database as to whether the task for the network device was successful. For any network device to which communication was performed using SNMPv3 and the task was successful, the security setting is changed in steps from S706 to S710 in a similar manner as in the first embodiment. Because these steps are similar to those in the first embodiment, a duplicated explanation thereof is omitted.

In the process described above, it is possible to dynamically change the security setting associated with the network device depending on the result of the task executed by the management apparatus for the network device.

The present invention may be embodied in many forms such as a system, an apparatus, a method, a program, a storage medium, etc. The present invention may be applied to a system including a plurality of devices or may be applied to an apparatus including only a single device.

The scope of the present invention includes a case in which a computer-readable storage medium having a software program and/or computer-executable instructions is directly or remotely supplied to a system or an apparatus, and the system or the apparatus reads the program code and/or computer-executable instructions and executes it thereby achieving one or more functions according to an embodiment of the invention. In this case, the supplied program and/or computer-executable instructions may be one corresponding to one or more of the flow charts associated with the embodiments described above.

Thus, the storage medium having the program code and/or computer-executable instructions installed on a computer to implement one or more functions according to any of the above-described embodiments of the invention on the computer also falls within the scope of the present invention. That is, the storage medium having the computer program and/or computer-executable instructions for realizing one or more functions according to any of the above-described embodiments of the invention may also fall within the scope of the present invention.

In this case, there is no particular restriction on the form of the program and/or computer-executable instructions. That is, the program and/or computer-executable instructions may be realized in various forms such as an object code, a program executed by an interpreter, script data supplied to an operating system, etc.

Examples of storage media for use in supplying programs and/or computer-executable instructions include a floppy disk, a hard disk, an optical disk, a magneto-optical disk, an MO disk, a CD-ROM disk, a CD-R disk, a CD-RW disk, a magnetic tape, a nonvolatile memory card, a ROM, and a DVD (DVD-ROM or DVD-R).

The program and/or computer-executable instructions may also be supplied such that a client computer is connected to an Internet Web site via a browser, and a computer program and/or computer-executable instructions may be downloaded into a storage medium according to an embodiment of the invention, such as a hard disk of the client computer. In this case, the program and/or computer-executable instructions downloaded may be supplied in the form of a compressed file including the program and/or computer-executable instructions and an automatic installer. The program code of the program and/or computer-executable instructions may also be divided into a plurality of files, and respective files may be downloaded from different Web sites. Thus, a WWW server that allows a plurality of users to download a program file that realizes one or more functions according to any embodiment of the invention on a computer may also fall within the scope of the present invention.

The program and/or computer-executable instructions may be stored in an encrypted form on a storage medium according to an embodiment of the present invention, such as a CD-ROM, and may be distributed to users. In this case, particular authorized users may be allowed to download key information used to decrypt the encrypted program and/or computer-executable instructions from a Web site via the Internet. The program and/or computer-executable instructions decrypted using the key information may be installed on a computer.

Furthermore, the scope of the present invention may include not only such an implementation of functions of an embodiment described above simply by reading and executing a program on a computer-readable storage medium by a computer, but also an implementation of the functions of an embodiment by cooperation with an OS running on the computer in accordance with an instruction from the program. In this case, one or more functions according to an embodiment of the present invention may be realized by performing a process that is partially or wholly performed by the OS or the like in cooperation with the computer-readable storage medium.

A program and/or computer-executable instructions may be read from a storage medium and loaded into a memory of a function extension board inserted in a computer, or into a memory of a function extension unit connected to the computer, thereby realizing one or more functions according to an embodiment of the invention as described above. In this case, after the program is loaded into the function extension board or the function execution unit, a CPU or the like disposed on the function extension board or in the function extension unit may partially or wholly execute the process in accordance with the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-151820 filed Jun. 10, 2008, which is hereby incorporated by reference herein in its entirety.

What is claimed is:

1. A network device management apparatus comprising:
a search unit configured to search for a network device supporting a first communication protocol;
an authentication information input unit configured to input authentication information used in communication with the network device using the first communication protocol;
an authentication executing unit configured to execute authentication of the network device by using the authentication information;
a first checking unit configured to, when the authentication by the authentication executing unit is successful, check whether communication with the network device using a second communication protocol with a security level lower than the first communication protocol is possible as well as the communication with the network device using the first communication protocol; and
a setting changing unit configured to change a setting of the second communication protocol by sending a disabling instruction for disabling the setting of the second communication protocol in order to make the communication using the second communication protocol impossible in a case where the communication with the network device using the second communication protocol with the security level lower than the first communication protocol is possible as a result of the checking performed by the first checking unit,
wherein the setting changing unit sends an enabling instruction for enabling setting for a reading process using the second communication protocol, in a case where authentication by the authentication executing unit using an account being input in an initial setup operation by a service person is successful or where IPSec being capable of encryption for each packet is determined to be valid.

2. The network device management apparatus according to claim 1, wherein the second communication protocol is a communication protocol of a lower version of the first communication protocol.

3. The network device management apparatus according to claim 1,
wherein the setting unit changes the setting of the second communication protocol by sending the disabling instruction for disabling the setting of the second communication protocol in order to make the communication using the second communication protocol impossible, in a case where the authentication by the authentication executing unit using the account being input in the initial setup operation by the service person is not successful and where the IPSec being capable of encryption for each packet is determined to be valid.

4. The network device management apparatus according to claim 1,
  wherein the setting changing unit sends an enabling instruction for enabling setting for a reading process using the second communication protocol, in a case where authentication by the authentication executing unit using an account being input in an initial setup operation by a service person is successful, and
  wherein the setting unit changes the setting of the second communication protocol by sending the disabling instruction for disabling the setting of the second communication protocol in order to make the communication using the second communication protocol impossible, in a case where the authentication by the authentication executing unit using the account being input in the initial setup operation by the service person is not successful.

5. The network device management apparatus according to claim 1, further comprising a second checking unit configured to, if a result of the checking by the first checking unit indicates that the second communication protocol is enabled in the network device, then further check whether a third communication protocol with a security function is used in a lower layer of a network than the first or second communication protocol.

6. The network device management apparatus according to claim 5, wherein
  if a result of the checking by the second checking unit indicates that the third communication protocol is used, then the first communication protocol used by the network device is set to be usable only in reading,
  while if the result of the checking indicates that the third communication protocol is not used, then the first communication protocol used by the network device is set to be disabled.

7. The network device management apparatus according to claim 1, wherein the first communication protocol is SNMP version 3, and the second communication protocol is SNMP version 1 or SNMP version 2.

8. The network device management apparatus according to claim 5, wherein the third communication protocol is IPSec.

9. The network device management apparatus according to claim 1, further comprising:
  a task execution unit configured to execute a management task on the network device at a specified time using the first communication protocol;
  an acquisition unit configured to acquire an execution result of the management task executed by the task execution unit; and
  a communication judgment unit configured to make a judgment, based on the execution result of the management task acquired by the acquisition unit, as to whether communication with the network device is possible using the first communication protocol,
  wherein if the judgment made by the communication judgment unit is that the communication with the network device using the first communication protocol is possible, then the setting of the second communication protocol for the network device is changed.

10. A network device management method comprising:
  searching for a network device supporting a first communication protocol;
  inputting authentication information used in communication with the network device using the first communication protocol;
  executing authentication of the network device by using the authentication information;
  if the authentication is successful, performing a first check as to whether communication with the network device using a second communication protocol with a security level lower than the first communication protocol is possible as well as the communication with the network device using the first communication protocol; and
  changing a setting of the second communication protocol by sending a disabling instruction for disabling the setting of the second communication protocol in order to make the communication using the second communication protocol impossible in a case where the communication with the network device using the second communication protocol with the security level lower than the first communication protocol is possible as a result of the first check,
  wherein the setting of the second communication protocol is changed by sending an enabling instruction for enabling setting for a reading process using the second communication protocol, in a case where authentication using an account being input in an initial setup operation by a service person is successful or where IPSec being capable of encryption for each packet is determined to be valid.

11. The network device management method according to claim 10, wherein the second communication protocol is a communication protocol of a lower version of the first communication protocol.

12. The network device management method according to claim 10,
  wherein the setting of the second communication protocol is changed by sending the disabling instruction for disabling the setting of the second communication protocol in order to make the communication using the second communication protocol impossible, in a case where the authentication using the account being input in the initial setup operation by the service person is not successful and where the IPSec being capable of encryption for each packet is determined to be valid.

13. The network device management method according to claim 10,
  wherein the setting of the second communication protocol is changed by sending an enabling instruction for enabling setting for a reading process using the second communication protocol, in a case where authentication using an account being input in an initial setup operation by a service person is successful, and
  wherein the setting of the second communication protocol is changed by sending the disabling instruction for disabling the setting of the second communication protocol in order to make the communication using the second communication protocol impossible, in a case where the authentication using the account being input in the initial setup operation by the service person is not successful.

14. The network device management method according to claim 10, further comprising, if a result of the first check indicates that the second communication protocol is enabled in the network device, then performing a second check as to whether a third communication protocol with a security function is used in a lower layer of a network than the first or second communication protocol.

15. The network device management method according to claim 14, wherein if a result of the second check indicates that the third communication protocol is used, then the first communication protocol used by the network device is set to be usable only in reading, while if the result of the second check indicates that the third communication protocol is not used, then the first communication protocol used by the network device is set to be disabled.

16. The network device management method according to claim 10, wherein the first communication protocol is SNMP version 3, and the second communication protocol is SNMP version 1 or SNMP version 2.

17. The network device management method according to claim 14, wherein the third communication protocol is IPSec.

18. The network device management method according to claim 10, further comprising:
   executing a management task on the network device at a specified time using the first communication protocol;
   acquiring an execution result of the management task; and
   making a communication judgment, based on the execution result of the management task, as to whether communication with the network device is possible using the first communication protocol,
   wherein if the judgment made in the making of the communication judgment is that the communication with the network device using the first communication protocol is possible, then the setting of the second communication protocol for the network device is changed.

19. A non-transitory computer-readable storage medium having computer-executable instructions stored thereon for causing a network device management apparatus to perform a network device management method, the computer-readable storage medium comprising:
   computer-executable instructions for searching for a network device supporting a first communication protocol;
   computer-executable instructions for inputting authentication information used in communication with the network device using the first communication protocol;
   computer-executable instructions for executing authentication of the network device by using the authentication information;
   computer-executable instructions for, if the authentication is successful, performing a first check as to whether communication with the network device using a second communication protocol with a security level lower than the first communication protocol is possible as well as the communication with the network device using the first communication protocol; and
   computer-executable instructions for changing a setting of the second communication protocol by sending a disabling instruction for disabling the setting of the second communication protocol in order to make the communication using the second communication protocol impossible in a case where the communication with the network device using the second communication protocol with the security level lower than the first communication protocol is possible as a result of the first check,
   wherein the setting of the second communication protocol is changed by sending an enabling instruction for enabling setting for a reading process using the second communication protocol, in a case where authentication using an account being input in an initial setup operation by a service person is successful or where IPSec being capable of encryption for each packet is determined to be valid.

* * * * *